May 10, 1955
J. M. KROYER ET AL
2,708,143
DISPOSABLE BEARING STRUCTURE
Filed Nov. 8, 1952
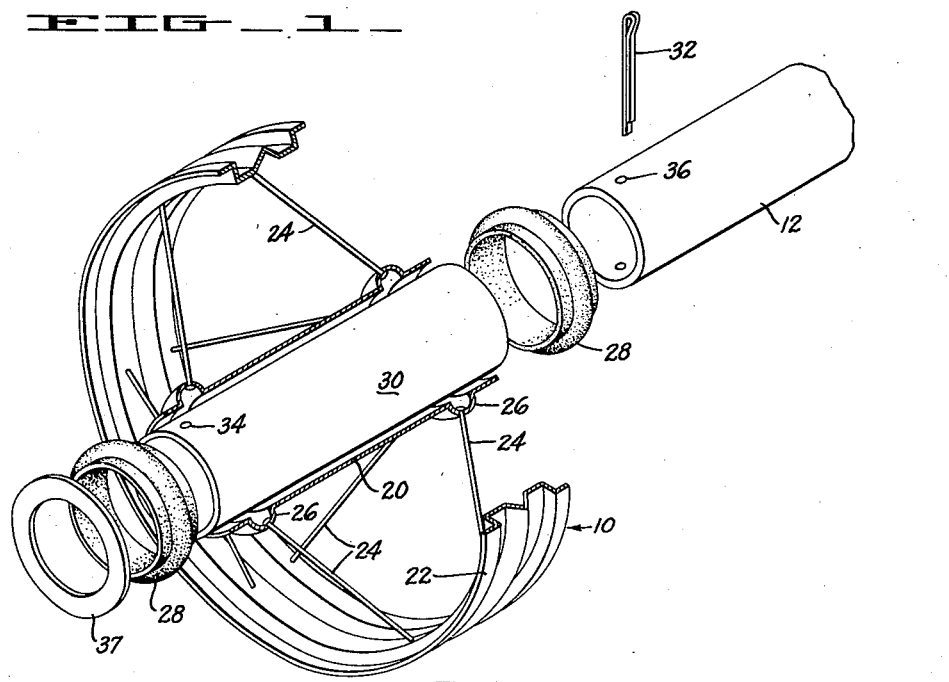
FIG_1_
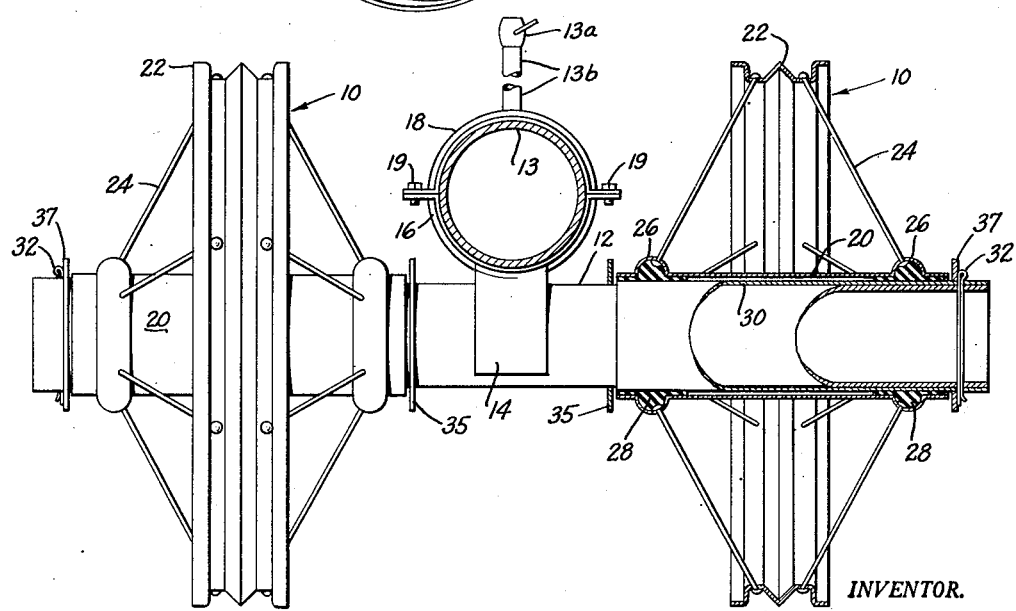
FIG_2_
INVENTOR.
John M. Kroyer
Alva E. Huntley
BY Naylor and Lassagne
ATTORNEYS

United States Patent Office

2,708,143
Patented May 10, 1955

2,708,143

DISPOSABLE BEARING STRUCTURE

John M. Kroyer and Alva E. Huntley, Portland, Oreg., assignors to Farmland Irrigation Company, Inc., a corporation of California Application November 8, 1952, Serial No. 319,572

6 Claims. (Cl. 308—16)

This invention relates to wheels and axles, and more particularly to a disposable bearing structure adapted to mount a wheel on an axle for rotation thereon.

The disposable bearing structure of the invention is particularly adapted for use in connection with wheeled farm machines and implements. In the conventional forms of wheel and axle arrangements in such machines and implements, lubricated anti-friction bearing means are provided between the wheel hub and the axle, and means are also provided to seal the bearings against dirt, and the like. The bearing systems in these wheel and axle assemblies must be maintained in a lubricated condition. Very frequently, however, proper lubrication is not maintained, the practical result being that the machine or implement is rendered inoperative and is allowed to stand idle and in many cases deteriorate under the action of weather conditions and the like. In any event, unless the bearing systems are properly lubricated and maintained in this condition, it becomes necessary to replace them, and this involves a fairly substantial expense.

The essential purpose and object of this invention is to provide a simple bearing system for a wheel and axle assembly which requires no lubrication or sealing and which embodies a disposable wear element which may be simply and readily replaced at a very nominal expense.

Other objects and advantages of the invention will be apparent from the following description taken in conjunction with the drawing forming part of this specification, and in which:

Figure 1 is an exploded view in perspective of the elements forming the wheel, axle and bearing system of the invention; and Figure 2 is a view in rear elevation of a single dolly embodying the axle bearing structure of the invention, with one side of the wheel and axle assembly being shown in diametral section and having parts broken away for purposes of clarity.

Referring to the drawing, the dolly shown in Figure 2 comprises a pair of wheels 10 rotatably mounted on an axle 12. The particular dolly illustrated is adapted to transport a section of irrigation pipeline 13 supporting rotatable sprinklers 13a on risers 13b, from place to place on land to be irrigated. For this purpose the axle 12 has secured thereto a support member 14, a semi-circular yoke element 16 secured to the support member and serving as a cradle for the pipeline 13, and an upper clamping yoke 18 adapted to be removably secured to yoke element 16 by means such as bolts 19.

The details of the wheel, axle and disposable bearing combination of the invention will now be described. The wheel 10 comprises a tubular hub 20, a rim 22, and spokes 24 interconnecting these elements. Each hub 20 is provided with a pair of annular recesses 26 serving as seating means for a pair of removable rubber bearing members 28 which are maintained against lateral displacement by their inherent resilience. The hub and its rubber bearing members 28 receive a tubular disposable bearing member 30 in the form of a sleeve of steel or other wear-resisting material, which in turn surrounds the axle 12 and is secured thereto, as by a cotter pin 32 extending through aligned apertures 34 and 36 formed, respectively, in the outer ends of the disposable bearing member 30 and the axle 12. The area of members 28 in contact with the interior of the hub 20 being greater than the area in contact with the member 30 tends to prevent rotation of members 28 within hub 20 and the inner ends of spokes 24 engaging members 28 also contribute to such retention of members 28 against rotation. The hub 20 is maintained on the member 30 against endwise movement by a stop member 35 secured to axle 12, and by a washer 37 disposed between the outer end of the hub and the cotter pin 32. The washer 37 prevents the hub from wearing or being worn by the cotter pin.

As the described wheel and axle assembly is moved over the ground, the wheels rotate with respect to the axle and the sleeve pinned thereto, with the inner faces of the rubber bearing members 28 moving over the surface of the bearing member 30. Substantially all of the wear is taken by the bearing member 30. Thus, when a disposable bearing member 30 has become worn to the point where it no longer constitutes a good bearing surface for the rubber bearing members 28, the disposable bearing member 30 is removed and replaced by a new one. The rubber bearing members 28 are likewise easily replaced when worn. In practice, it has been found, however, that a set of rubber bearing members outlasts a plurality of the disposable bearing members 30. There is no need to lubricate the bearing surfaces to protect the wear-receiving member 30, since replacements are of very low cost. The essential function of the disposable bearing member 30 is, of course, to protect the axle from wear. It is entirely unnecessary to incur the expense of providing any means for sealing the bearing structure against dust and grit. In fact, it is preferable to leave the ends of the bearing structure open, as shown at 35, so that water, from rain or from irrigation sprinklers, may wash the bearing surfaces clean as the wheels rotate and act to some extent as a lubricant.

The subject invention therefore provides a simple and novel bearing system for a wheel and axle assembly, a preferred embodiment of which system has been shown and described.

What is claimed is:

1. A wheel bearing of the class described comprising, in combination with a wheel having a tubular hub rotatable on an axle, a disposable cylindrical bearing member surrounding said axle within said tubular hub, one or more rubber bearing members removably retained within said hub in surrounding relation to said cylindrical bearing member and adapted to rotate thereon, and means for releasably securing said cylindrical bearing member to said axle.

2. A wheel bearing according to claim 1 in which a plurality of said rubber bearing members are arranged in axially spaced relationship within said hub.

3. A wheel bearing of the class described comprising, in combination with a wheel having a tubular open-ended hub rotatable on an axle, a disposable cylindrical bearing member surrounding said axle within said hub, one or more rubber bearing members removably retained within said hub surrounding said cylindrical bearing member for rotation thereon and adapted to hold the latter radially spaced from the interior of said hub so that water may freely enter the space between said members, and means for releasably securing said cylindrical bearing member to said axle.

4. A wheel bearing of the class described comprising, in combination with a wheel having a tubular hub rotatable on an axle, a disposable cylindrical bearing member surrounding said axle within said tubular hub, a pair of axially spaced circumferential grooves in said hub, a pair of annular rubber bearing members each provided with an exterior rib fitting one of said grooves and adapted to be held therein by the inherent resiliency of the rubber bearing member; said rubber bearing members surrounding said cylindrical bearing member within said hub, and means for releasably securing said cylindrical bearing member to said axle comprising a pair of aligned apertures in said cylindrical bearing member, an aperture in said axle adapted for alignment with the said apertures, and a pin insertible through all of said apertures.

5. A wheel bearing of the class described comprising, in combination with a wheel having a tubular open-ended hub rotatable on an axle, a disposable cylindrical bearing member surrounding said axle within said tubular hub, at least one rubber bearing member removably retained within said hub surrounding said cylindrical member in frictional engagement therewith, means for releasably securing said cylindrical bearing member to said axle, and means on said tubular hub engaging said rubber bearing member and adapted to rotate said rubber bearing member about said cylindrical member during rotation of said wheel.

6. A wheel bearing according to claim 4 in which a plurality of said rubber bearing members are arranged in axially spaced relationship within said hub and are adapted to hold said cylindrical member radially spaced from the interior of said hub so that water may freely enter the space between said hub and said tubular member.

References Cited in the file of this patent

UNITED STATES PATENTS

| | | |
|---|---|---|
| 1,461,223 | Nauts | July 10, 1923 |
| 1,464,566 | Ford | Aug. 14, 1923 |
| 2,189,464 | Frisbie | Feb. 6, 1940 |